M. PIANKO.
TIRE LINER.
APPLICATION FILED DEC. 27, 1918.
1,320,708.
Patented Nov. 4, 1919.
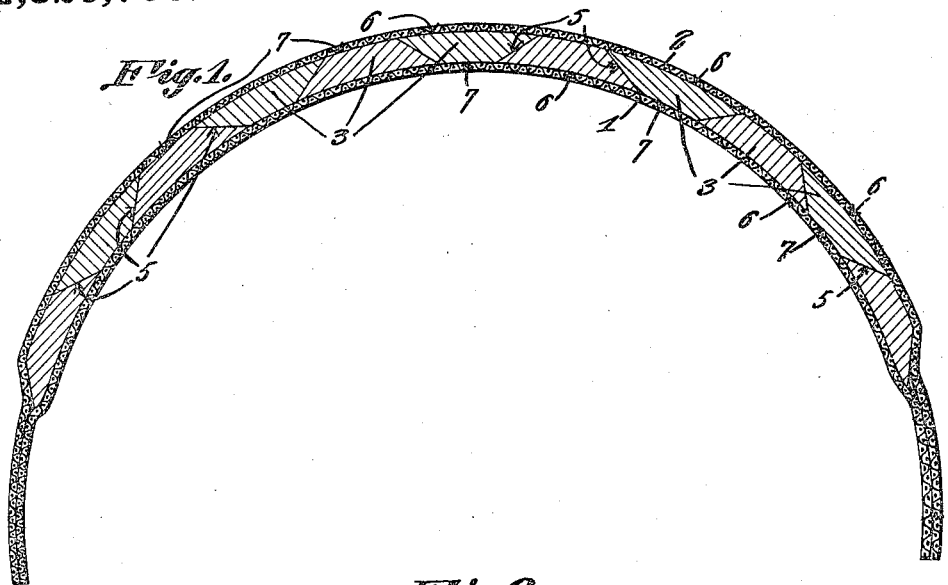
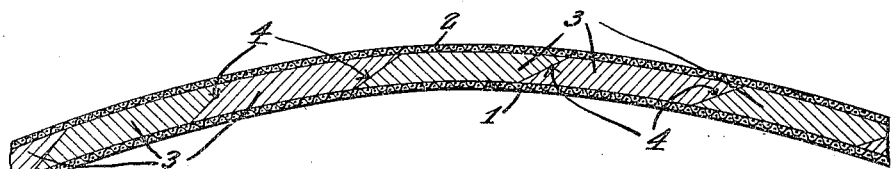
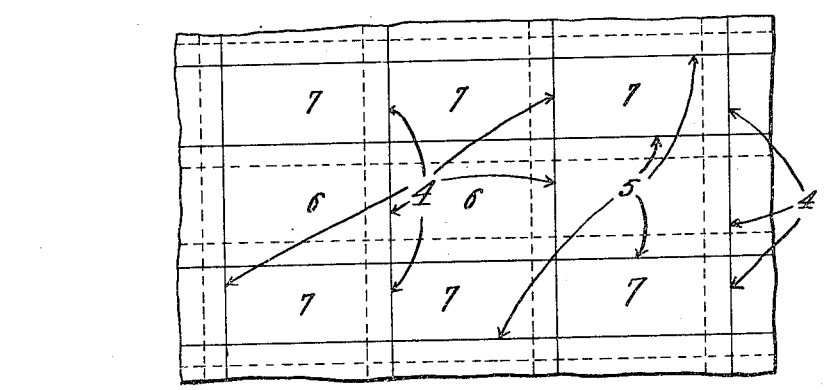
M. Pianko, Inventor
Witness
By Attorney

UNITED STATES PATENT OFFICE.

MENDEL PIANKO, OF CHICAGO, ILLINOIS.

TIRE-LINER.

1,320,708.  Specification of Letters Patent.  Patented Nov. 4, 1919.

Application filed December 27, 1918. Serial No. 268,495.

*To all whom it may concern:*

Be it known that I, MENDEL PIANKO, a citizen of the United States, residing at Chicago, in the county of Cook and State of Illinois, have invented a new and useful Tire-Liner, of which the following is a specification.

This invention relates to internal armor for pneumatic tires, one of its objects being to provide a light and compact lining for a tire casing which will protect the inner tube from punctures, will not generate heat, and will not injure the parts of the tire by abrasion.

A further object is to provide an armor made up of plates of celluloid capable of being shaped readily to the tire with which the armor is used and which will not interfere with the resiliency of the tire, the parts of the armor being so assembled as to protect fully the inner tube of the tire so that no nails or the like can pass between the plates.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings—

Figure 1 is a transverse section through the liner or interior armor of a tire.

Fig. 2 a longitudinal section therethrough.

Fig. 3 is a plan view of a portion thereof.

Referring to the figures by characters of reference, 1 and 2 designate strips of canvas or other suitable material and between these strips are arranged plates 3 arranged in parallel series, the plates of each series being oppositely disposed with relation to the plates of the next adjoining series. Each plate 3 has its ends beveled as at 4 so as to lie in substantially parallel planes while the sides of each plate are beveled as at 5 so as to converge, as shown so that the sides of the plates of one longitudinal series will fit snugly in contact with the sides of the corresponding plates of the next adjoining series. Thus it will be seen that by providing each plate with the beveled sides, each plate has a broad face 6 and a narrow face 7.

In making the armor the plates are preferably formed of celluloid and can be of any desired proportions. The plates are arranged in parallel longitudinal series with the ends 4 contacting and with the plates of one series disposed oppositely to the plates of the next adjoining series so that the plates of one series will have their narrow faces 7 on the innermost strip 1 while the broad faces 6 of the next adjoining series of plates will be on said innermost strips. The plates are secured to the canvas strips 1 and 2 with a suitable cement or binder and, by reason of the contacts between the sides of the plates 3 and between the ends thereof, the completed armor thus produced can be flexed readily.

After the plates and the canvas strips have been assembled as described, the entire liner or armor can be placed in hot water to soften the celluloid and can thereafter be pressed into shape to fit snugly between the casing and inner tube of the tire with which it is to be used. The celluloid can thus be shaped without causing the plates to stick together and as all of the plates lap the edges of the next adjoining plates, it will be apparent that, when the armor is in place, it becomes impossible for a nail or the like to pass between the plates. Furthermore, because of the nature of the celluloid, no nails or the like can force their way through them. Consequently, an armor such as described, affords first class protection for the inner tube and is also advantageous because of its flexibility, durability, and compactness. As the celluloid is flexible it will not abrade the tire as do metal plates when used with armor. Nor will the celluloid generate heat.

What is claimed is:

An internal armor for tires, including superposed fabric strips, parallel series of substantially rectangular flexible plates cemented to and housed between the strips, each plate being beveled on one face along three edges and on the opposite face along the fourth edge, the plates of each series having their beveled ends abutting and the beveled edges of the plates of each series having moving engagement with the edges of the plates of the next adjoining series, the plates of each series being inverted relative to the plates of the next adjoining series, the ends of the corresponding plates of the several series being in transverse alinement.

In testimony that I claim the foregoing as my own, I have hereto affixed my signature in the presence of a witness.

MENDEL PIANKO.

Witness:
IVY E. SIMPSON.

Copies of this patent may be obtained for five cents each, by addressing the "Commissioner of Patents, Washington, D. C."